United States Patent
Blanusa

(10) Patent No.: US 12,132,228 B2
(45) Date of Patent: Oct. 29, 2024

(54) BATTERY UNIT, METHOD FOR ELECTRICALLY INTERCONNECTING CELL STACKS OF A BATTERY UNIT AND METHOD FOR SEPARATING AN ELECTRICAL INTERCONNECTION OF CELL STACKS OF A BATTERY UNIT

(71) Applicant: Daimler AG, Stuttgart (DE)

(72) Inventor: Denis Blanusa, Moeglingen (DE)

(73) Assignee: Daimler AG, Stuttgart (DE)

(*) Notice: Subject to any disclaimer, the term of this patent is extended or adjusted under 35 U.S.C. 154(b) by 914 days.

(21) Appl. No.: 17/269,743

(22) PCT Filed: Aug. 14, 2019

(86) PCT No.: PCT/EP2019/071804
§ 371 (c)(1),
(2) Date: Feb. 19, 2021

(87) PCT Pub. No.: WO2020/038793
PCT Pub. Date: Feb. 27, 2020

(65) Prior Publication Data
US 2021/0257705 A1    Aug. 19, 2021

(30) Foreign Application Priority Data
Aug. 21, 2018   (DE) .................. 10 2018 006 621.6

(51) Int. Cl.
*H01M 50/517*   (2021.01)
*H01M 50/204*   (2021.01)
(Continued)

(52) U.S. Cl.
CPC ....... *H01M 50/517* (2021.01); *H01M 50/204* (2021.01); *H01M 50/209* (2021.01);
(Continued)

(58) Field of Classification Search
CPC ............ H01M 50/517; H01M 50/204; H01M 50/209; H01M 50/249; H01M 50/503;
(Continued)

(56) References Cited

U.S. PATENT DOCUMENTS

| 5,496,657 A | 3/1996 | Dixon, Jr. |
| 8,975,774 B2 | 3/2015 | Kreutzer et al. |

(Continued)

FOREIGN PATENT DOCUMENTS

| CN | 201975466 U | * | 9/2011 | ............. Y02E 60/10 |
| CN | 106025162 A | * | 10/2016 | ............. H01M 2/22 |

(Continued)

OTHER PUBLICATIONS

PCT/EP2019/071804, International Search Report dated Nov. 6, 2019 (Two (2) pages).

(Continued)

*Primary Examiner* — Kaity V Chandler
(74) *Attorney, Agent, or Firm* — Crowell & Moring LLP

(57) ABSTRACT

A battery unit of a vehicle includes a plurality of cell stacks which each include a respective plurality of cells electrically interconnected to one another, an electrical attachment contact, and a contact key element. The contact key element has a contact region and is electrically insulating outside of the contact region. In a first contact position of the contact key element the plurality of cell stacks are interconnected electrically to one another via the contact region and in a subsequent second contact position of the contact key element the plurality of cell stacks that are interconnected electrically to one another are electrically connected to the electrical attachment contact.

9 Claims, 4 Drawing Sheets

(51) Int. Cl.
*H01M 50/209* (2021.01)
*H01M 50/249* (2021.01)
*H01M 50/503* (2021.01)
*H01M 50/51* (2021.01)

(52) U.S. Cl.
CPC ....... *H01M 50/249* (2021.01); *H01M 50/503* (2021.01); *H01M 50/51* (2021.01); *H01M 2220/20* (2013.01)

(58) Field of Classification Search
CPC ............ H01M 50/51; H01M 2220/20; H01M 50/258; H01M 10/4207; B60L 50/64; Y02E 60/10; Y02T 10/70
See application file for complete search history.

(56) References Cited

U.S. PATENT DOCUMENTS

| | | | |
|---|---|---|---|
| 11,637,339 B2 * | 4/2023 | Lim | H01M 50/242 429/120 |
| 2006/0208698 A1 | 9/2006 | Maguire et al. | |
| 2018/0034020 A1 * | 2/2018 | Neuss | H01M 10/0525 |
| 2018/0287110 A1 * | 10/2018 | Yanagihara | H01M 50/178 |
| 2019/0280277 A1 * | 9/2019 | Kato | H01M 50/548 |

FOREIGN PATENT DOCUMENTS

| | | | | |
|---|---|---|---|---|
| DE | 10 2008 034 876 A1 | 1/2010 | | |
| DE | 10 2011 101 352 A1 | 11/2012 | | |
| DE | 10 2013 020 942 A1 | 6/2015 | | |
| JP | 2018110082 A * | 7/2018 | ............. | Y02E 60/10 |
| KR | 20160050492 A * | 5/2016 | ............. | Y02E 60/10 |
| WO | WO-2010114311 A2 * | 10/2010 | ........... | B60L 3/0046 |
| WO | WO 2013/182589 A2 | 12/2013 | | |
| WO | WO-2016204470 A1 * | 12/2016 | .......... | H01M 10/052 |
| WO | WO-2018065580 A1 * | 4/2018 | .......... | H01M 2/1077 |
| WO | WO 2019/016077 A1 | 1/2019 | | |

OTHER PUBLICATIONS

German-language German Office Action issued in German application No. 10 2018 006 621.6 dated May 28, 2019 (Ten (10) pages).
English-language Chinese Office Action issued in Chinese application No. 201980053029.7 dated Jul. 21, 2022 (Five (5) pages).
Chinese Office Action issued in Chinese application No. 201980053029.7 dated Feb. 17, 2023, with partial English translation (Sixteen (16) pages).

* cited by examiner

BATTERY UNIT, METHOD FOR ELECTRICALLY INTERCONNECTING CELL STACKS OF A BATTERY UNIT AND METHOD FOR SEPARATING AN ELECTRICAL INTERCONNECTION OF CELL STACKS OF A BATTERY UNIT

BACKGROUND AND SUMMARY OF THE INVENTION

The invention relates to a battery unit, a method for electrically interconnecting cell stacks of a battery unit and a method for separating an electrical interconnection of cell stacks of a battery unit.

As described in DE 10 2011 101 352 A1, an HV battery, in particular a traction battery for a vehicle, is known from the prior art. The HV battery comprises several cell modules which each comprise several cells. A controller for monitoring the cells and/or for balancing the cells is allocated to each cell module. The controllers are attached to a battery management control device for purposes of communication or control and/or regulation. The HV battery is formed to be modular by the cell modules being formed as plug modules that can be fixed or are fixed releasably on a circuit board.

A battery having a heat conducting plate arranged in a battery housing for tempering the battery and a method for producing a battery are described in DE 10 2008 034 876 A1. Several single cells interconnected to one another electrically in parallel and/or in series by means of a cell connector circuit board are connected to the heat conducting plate to conduct heat. At least one spring element is provided, by means of which the single cells can be pressed onto the heat conducting plate in a defined manner. One or more pre-tensioning elements for pre-tensioning and fixing the spring element are arranged on the cell connector circuit board or on the heat conductor plate.

A method for maintaining, repairing and/or optimizing a battery is known from DE 10 2013 020 942 A1. As its components, the battery comprises a number of single cells interconnected to one another in series and/or in parallel with electric pole contacts, which are, directly or by means of cell connectors, connected to one another in a positive-locking and/or bonded manner for the electrical interconnection by forming an overlapping region, and/or a battery monitoring unit having a number of attachment elements, which are connected to the electric pole contacts and/or to the cell connectors in a positive-locking and/or bonded manner by forming a further overlapping region. To exchange a component, the positive-locking and/or bonded connection of the component to be exchanged with at least one component that is not to be exchanged is separated immediately next to the overlapping region, and a replacement component is connected in a positive locking and/or bonded manner to the overlapping regions of the at least one component that is not to be exchanged by means of its electric pole contacts or its attachment elements by forming a respectively new overlapping region.

The object of the invention is to specify an improved battery unit over the prior art, an improved method over the prior art for electrically interconnecting cell stacks of a battery unit and an improved method over the prior art for separating an electrical interconnection of cell stacks of a battery unit.

A battery unit, in particular for a vehicle, comprises several cell stacks which each comprise a plurality of single cells electrically interconnected to one another, in particular in series and/or in parallel.

According to the invention, a contact key element is provided or several contact key elements are provided, wherein the contact key element or the respective contact key element has a contact region or several contact regions and is formed outside the contact region or the several contact regions in an electrically insulating manner, wherein the cell stacks are to be electrically, in particular in series, interconnected firstly to one another by means of the contact regions by moving the contact key element successively into different contact positions or by moving the contact key elements successively into their respective contact position and are then to electrically contact electrical attachment contacts. The one contact key element or the several contact key elements and a cell stack arrangement, comprising the cell stacks, are formed in such a way as to make this possible. In particular, the contact key element is or the several contact key elements are correspondingly geometrically encoded. The contact key element or the contact key elements advantageously remains/remain in the battery unit, i.e., the described movement takes place in the battery unit, in particular by increasing shifting for electrical contacting and by increasing retracting for separating the electrical connecting, yet a complete removal out of the battery unit advantageously does not take place, such that the contact key element or the contact key elements cannot get lost and/or be positioned incorrectly.

By means of the solution according to the invention, works to the battery unit, which advantageously forms a high-voltage battery and can thus be used, for example, as a traction battery for a vehicle, can be avoided with high battery voltages once all cell stacks are electrically interconnected to one another and connected to the electrical attachment contacts. By means of the solution according to the invention, the battery unit can be produced mechanically without the cell stacks being electrically connected to one another. Thus, a maximum voltage on the respective cell stack is advantageously below a critical limit of 60 Volt, for example, such that safety during work on the battery unit is considerably increased and no special safety measures are required for this, which would be necessary for works under high-voltage conditions. The cell stacks are only electrically connected to one another by means of the contact key element or the several contact key elements and to the electrical attachment contacts, whereby the correspondingly high voltage abuts on the electrical attachment contacts.

In a possible embodiment, the cell stacks are to be electrically, in particular in series, interconnected to one another in several steps increasingly by moving the contact key element successively into the different contact positions or by moving the contact key elements successively into their respective contact position, wherein, in a final step before electrically contacting the electrical attachment contacts, all cell stacks are to be electrically interconnected to one another. The one contact key element or the several contact key elements and the cell stack arrangement, comprising the cell stacks, are formed in such way as to make this possible. In particular, the contact key element is or the several contact key elements are correspondingly geometrically encoded. In this way, firstly a step-by-step electrical, in particular series, interconnection of the cell stacks takes place and thus an upshift by several electrical series interconnections of cell stacks, whereby the electrical voltages of these electrical series interconnections are increasingly increased until finally the high voltage of the now completely interconnected battery abuts on the electrical attachment contacts after these are electrically contacted with the cell stacks. The battery is required for driving a vehicle, for example.

In particular in the event of errors, repairs or maintenance, the electrical interconnections of the cell stacks are separated again by a corresponding return movement of the at least one contact key element from its contact position or the contact key elements from their contact positions in a simple manner, whereby partial voltages of the cell stacks are reproduced which lie below the critical limit of 60 Volt DC voltage, for example, whereby handling and working are permitted without a high-voltage specification.

Furthermore, since in this solution the electrical interconnections of the cell stacks are not already produced during the mechanical formation of the cell stack arrangement, but rather afterwards, no connection errors that were undetected during production can emerge which would make complete disassembly necessary. Since the electrical interconnections of the cell stacks are the final steps of manufacturing the ready-to-use battery, contact errors possibly emerging can simply be remedied, for example by replacing an erroneous contact key element. In the prior art, the electrical interconnection of the cell stacks is carried out by soldering, for example, during the mechanical formation of the battery, such that contact errors emerging here must be repaired substantially more laboriously by disassembling the battery and, in particular, by separating the solders, than with the solution according to the invention.

Advantageously, the contact key element or the contact key elements can be moved from outside, in particular from outside a battery housing or at least from outside the cell stacks mechanically connected to one another, in particular from outside the cell stack arrangement.

In doing so, it is ensured that contacts to be contacted by means of the contact regions on the cell stacks cannot be touched from outside, such that there is no possible danger of an outside electrical contact. The contacts of the cell stack can only be reached and touched at the earliest when the electrical connections between the cell stacks are separated. Furthermore, the contact key element or the several contact key elements is/are advantageously formed by the arrangement of the respective contact region and the electrical insulation in such a way that the respective contact region can also only be reached and thus touched when it no longer has an electrical connection to the cell stacks, in order to also thus avoid a conduction of a high voltage outside.

For example, the contact key element or at least one of the contact key elements is formed to be rod-like, wherein, in several contact regions, these are arranged one behind the other in the longitudinal extension direction of the rod-like contact key element, or the contact key element or at least one of the contact key elements is formed to be comb-like, wherein several contact regions are arranged one next to the other on a comb base body in a comb-crenellated manner. The respective formation is determined, in particular, by the arrangement of the cell stacks and their electrical contacts to be contacted with the respective contact key element.

With several contact key elements, the contact key elements each have, for example, an individual shaping, which is formed correspondingly to a receiver recess for the respective contact key element. Thus, an incorrect handling is prevented and, in a particularly simple manner, a correct electrical interconnection among the cell stacks and then their electrical linking to the attachment contacts is ensured. Alternatively or additionally, in the case of several contact key elements, this can also be supported by the contact key elements differing in terms of coloring and/or length.

With several symmetrical cell stack strands arranged one next to the other, symmetrical contact key elements are advantageously provided for the cell stack strands. Thus, a symmetrical electrical interconnection of the cell stacks of the cell stack strand and the subsequent electrical interconnection of the cell stack strands to one another and to the electrical attachment contacts are made possible. The cell stack strands thus each have the same voltage in each phase of the increasing electrical interconnection of their cell strands. In addition, as a result of this symmetry, the correct handling of the contact key elements is simplified since there are several identical plugging variants and thus few different plugging variants of the contact key elements which would complicate the handling, in particular the sequence of the movement of the contact key elements.

For example, the symmetrical contact key elements are connected to one another via a common handling element. Thus, these contact key elements can be moved together, whereby an expenditure of time for this is reduced. Alternatively or additionally, it can be provided, for example, that at least one of the comb-like contact key elements is formed symmetrically, i.e., has prongs, which are provided for several symmetrical cell stack strands. Thus, in particular an expenditure of time for electrically connecting the cell stack strand is reduced.

In a method according to the invention for electrically interconnecting the cell stacks of the battery unit, the one contact key element is moved successively into different contact positions or the plurality of contact key elements are moved successively into their respective contact position, whereby the cell stacks are electrically interconnected to one another by means of the contact regions and then are electrically contacted with the electrical attachment contacts. In a simple and safe manner, the method enables the formation of the useable battery, in particular high-voltage battery, from the battery unit by electrical interconnection of the cell stacks and their electrical contacting with the electrical attachment contacts.

In a method according to the invention for separating an electrical interconnection of the cell stacks of the battery unit, the one contact key element is removed successively from the various contact positions or the plurality of contact key elements are removed successively from their respective contact position, whereby firstly the electrical contact of the cell stacks with the electrical attachment contacts is separated and then the electrical interconnection between the cell stacks is separated. The method makes is possible to simply and safely carry out maintenance and repair works to cell stacks at low voltages, whereby, in particular, no safety precautions are necessary for high-voltage works.

Exemplary embodiments of the invention are explained in more detail below by means of drawings.

DETAILED DESCRIPTION OF THE DRAWINGS

Figure 1:
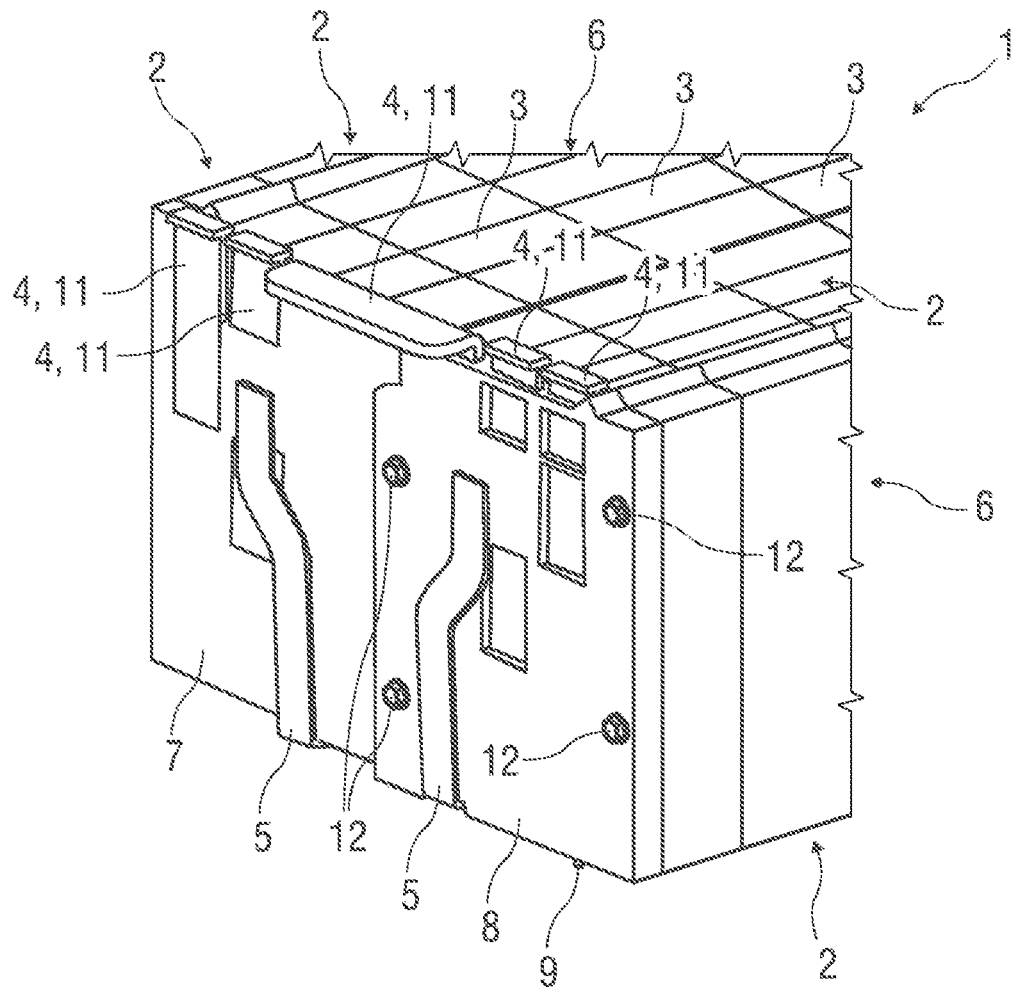
FIG. 1, schematically, is a perspective depiction of a battery unit.

Parts corresponding to one another are provided with the same reference numerals in all figures.

Figure 2:
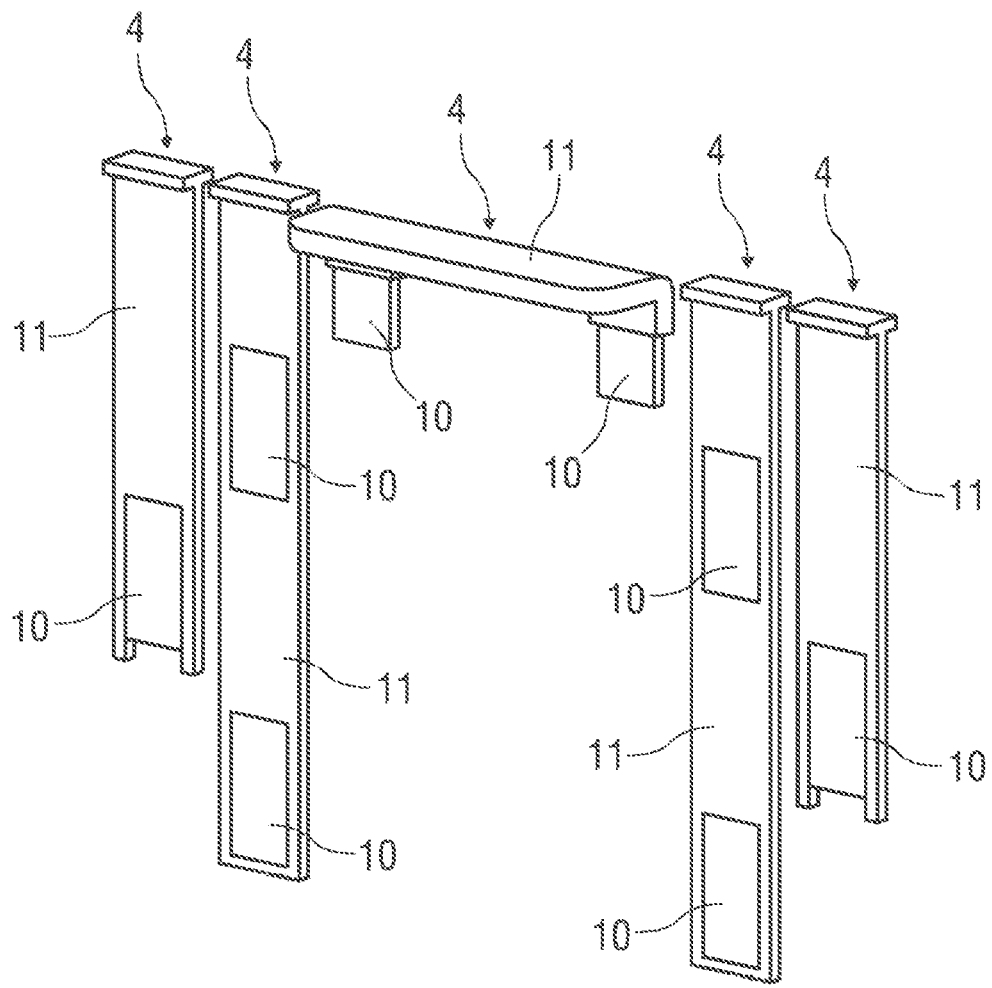
FIG. 2, schematically, shows contact key elements of the battery unit from FIG. 1.

FIGS. 1 and 3 to 6 show a battery unit 1, in particular for a vehicle. The battery unit 1 comprises several cell stacks 2 which each comprise a plurality of electrochemical individual cells 3 interconnected to one another in series and/or in parallel. FIG. 2 shows contact key elements 4 by means of which these cell stacks 2 are firstly to be interconnected to one another electrically in series and then to be electrically contacted with electrical attachment contacts 5. Thus, a battery, in particular a high-voltage battery, for the vehicle is formed from the battery unit 1, which can be used, in particular, as a traction battery for the vehicle, i.e., can provide electrical energy to at least one electrical drive engine for driving the vehicle.

By means of this battery unit 1, it is made possible for the electrically series interconnection of the individual cell stacks 2 to one another to be undertaken only finally, i.e., in particular only after a mechanical connection of the cell stacks 2 to a cell stack arrangement. This electrically series interconnection of the individual cell stacks 2 is carried out by means of the in particular pluggable contact key elements 4. In advance of this, since the cell stacks 2 are not yet interconnected to one another electrically in series, the battery unit 1 is still not a high-voltage battery, such that there is a higher degree of safety when dealing with the battery unit 1 because of the lower voltage and no high safety precautions required for high-voltage works have to be applied.

In the example depicted here, the battery unit 1 is constructed symmetrically and comprises two cell stack strands 6 arranged next to each other, each having several cell stacks 2. FIG. 1 shows a rear side of the battery unit 1. The cell stacks 2 are already mechanically connected, i.e., they form a cell stack arrangement of cell stacks 2 connected mechanically, yet not yet electrically, to one another. In the example depicted, the mechanical connection is carried out by means of tension rods 12.

The individual cells 3 of the respective cell stack 2 are interconnected electrically to one another by means of connection elements 7. In the depicted example, these connection elements 7 are clipped into a plastic part 8 at least on a rear side of the battery unit 1, the plastic part covering the rear side of the respective cell stack strand 6. In FIG. 1, the plastic part 8 is arranged on the right cell stack strand 6 to illustrate this construction, while it is not depicted on the left cell stack strand 6.

The plastic parts 8 on the rear side of the cell stack strand 6 have a positioning pin 9 on their lower side, the positioning pin forming a fixed bearing for the battery unit 1, for example in a battery housing that is not depicted. Only the electrical attachment contacts 5 of the battery unit 1, which serve to electrically contact the produced battery with an on-board electrical power supply of the vehicle, are accessible from the outside. As is described below, these electrical attachment contacts 5 are finally electrically contacted with the cell stacks 2 by means of the contact key elements 4, such that current only abuts on these electrical attachment contacts 5 when the battery is completed. In the example depicted here, these electrical attachment contacts 5 are formed as current rails of a so-called switch box, which has further electronic components such as contactors and fuses, which are pre-mounted in a battery housing.

To complete the battery, in particular high-voltage battery, electrical contacts of the cell stacks 2 are connected to one another electrically in series via the individual pluggable contact key elements 4, whereby the electrical voltage is increased by the electrical series switching of the cell stacks 2.

For each electrically series hook-up of cell stacks 2, a single contact key element 4 is used, which is advantageously encoded in such a way that it can be only be used for a specific cell stack connection. In the example depicted here according to FIG. 2 with the central contact key element 4, the attachment of all individual cells 3, i.e., the attachment of all cell stacks 2 already now electrically connected to one another, to the electrical attachment contacts 5 is produced only with the final appropriate contact key element 4. Thus, a safety concept is possible with which, in the event of errors, repairs and maintenance, the voltage can be reduced again in a simple manner by the electrical series connections being separated again by pulling the contact key elements 4 and partial voltages of the cell stacks 2 being able to be produced. These partial voltages are then below a critical limit of 60 Volt DC voltage and allow handling and works to the battery unit 1 without high voltage specifications.

With the battery unit 1, the contact key elements 4 are thus provided which each have a contact region 10 or several contact regions 10 and are formed to be electrically insulating, in particular made of plastic, outside the contact region 10 or the several contact regions 10. In particular, they have an electrically insulating handling element 11, i.e., a gripping section for handling the respective contact key element 4, which can be touched without risk. By moving the contact key elements 4 successively into their respective contact position, the cell stacks 2 are firstly electrically interconnected to one another by means of the contact regions 10 and then electrically contacted with the electrical attachment contacts 5.

Moving, in particular plugging, the contact key elements 4 into a respective contact position and similarly counter-moving, in particular pulling, the contact key elements 4 out of the respective contact position is advantageously carried out from outside, in particular from outside the battery unit 1, for example outside the battery housing or at least outside the cell stack arrangement of the cell stacks 2 already mechanically connected to one another. In particular, the contact regions 10 of the contact key elements 4 and the electrical contacts of the cell stacks 2 cannot be touched from outside, such that there is no possible danger of an electrically insulating contact from outside.

The contact regions 10 of the contact key elements 4 can only be touched from outside at the earliest when they are no longer in electrical contact with the cell stacks 2 and are thus volt-free. In order to ensure this, the respective contact key element 4 is formed to be electrically non-conductive, i.e., electrically insulating, outside the contact region 10 or the several contact regions 10, for example made of plastic, as already mentioned above. The electrical contacts of the cell stacks 2 can be touched at the earliest when a substantially lower voltage abuts on these contacts, for example only the voltage of the individual cells 3, interconnected to one another electrically in series and/or in parallel, of the respective cell strand 2.

As shown in FIG. 2, the respective contact key element can be formed in such a way, for example, that it has only one contact region 10, which connects only two cell stacks 2 electrically to each other, as shown in the example of the two outer contact key elements 4, or it has several contact regions 10, as shown in the example of the two inner contact key elements 4. For example, the respective contact key element 4 is formed to be rod-like, wherein, with several contact regions 10, these are arranged one behind the other in the longitudinal extension direction of the rod-like contact key element 4, or it is formed to be comb-like, wherein several contact regions 10 are arranged one next to another on a comb base body, as shown in the example of the central contact key element 4. The comb base body here also advantageously forms the handling element 11 of the contact key element 4, which can be grasped and handled without risk.

The electrically series interconnection of the cell stacks 2 can be carried out, for example, by plugging the contact key elements 4 in the linear sequence, i.e., beginning at one end of the respective cell stack strand 6 and then electrically connecting cell stack 2 after cell stack 2. Here, it can be provided, for example, that the contact key element 4 only has one contact region 10 which interconnects the cell stacks 2 of the cell stack strand 6 to one another electrically in series successively, i.e., adds these further cell stacks 2 to the cell stacks 2 already electrically connected to one another via the contact region 10 by contacting the contact region 10 with the electrical contacts of further cell stacks 2 for the electrical series interconnection.

Another possibility is a symmetrical contacting of cell stacks 2 of various cell stack strands 6 arranged one next to the other. For this, the rod-like or comb-like contact key element 4 has several contact regions 10, such that, when moving the contact key element 4, several electrical interconnections of cell stacks 2 of several cell stack strands 6 are possible at the same time, for example an electrically series interconnection of two cell stacks 2 in a cell stack strand 6 by means of a contact region 10 of the contact key element 4 and an electrically series interconnection of two cell stacks 2 in an adjacent cell stack strand 6 symmetrical to this by means of a further contact region 10 of the contact key element 4.

Alternatively, with such a symmetrical construction of the battery unit 1, individual contact key elements 4 can be moved, in particular plugged, symmetrically, i.e., in the individual symmetrical cell stack strands 6 in the same way.

The contact key elements 4 are advantageously encoded in such a way that a contact key element 4 only fits one specific connection and can only be inserted into a correspondingly formed recess, in particular because of its shape. For example, the contact key elements 4 each have an individual shape which is formed correspondingly to a receiver recess for the respective contact key element 4. Thus, an incorrect handling is prevented. In addition, this can be highlighted optically by different colors and/or lengths of the contact key elements 4.

In FIG. 2, the outer contact key elements 4 are designed symmetrically, but this time as individual rods. Alternatively, these rods can be connected to one another, in particular in a U-shape, for example via a handling element 11 formed as a handle, such that the electrical connections of cell stacks 2 in the two cell stack strands 6 can be produced by means of an individual movement, as shown in the central contact key element 4.

Along with the safety aspect already explained above because of the reduced voltage, if the cell stacks 2 are not electrically connected in series by means of the contact key elements 4, a simple mounting and error reduction is also achieved by the described solution, since the electrical connections between the cell stacks 2 must not already be produced during the mechanical formation of the cell stack arrangement and then, after producing the battery, possibly prove to be erroneous, but rather are generated safely at the end, as a final step or one of the final steps for producing the battery.

An important aspect of the described solution is that the electrical contacting of the cell stacks 2 with the electrical attachment contacts 5 is carried out as a final step. Thus, a voltage freedom on the attachment contacts 5 is ensured until the end. Vice versa, i.e., when separating the electrical connections, as the first step, the electrical contacting of the cell stacks 2 with the electrical attachment contacts 5 is separated, such that firstly the voltage freedom on the attachment contacts 5 is ensured.

Depending on the design, in an exemplary embodiment not depicted here, it can also be provided that only one single contact key element 4 is used, which has several contact regions 10, wherein these are arranged in such a way that the plugging sequence is replaced by a plugging depth of the one contact key element 4. This means that, by increasing movement into the cell stack arrangement and thus into different contact positions, increasingly more cell stacks 2 are interconnected to one another electrically in series and, by a maximum possible movement into a final contact position, the cell stacks 2 interconnected to one another electrically in series are then electrically connected to the electrical attachment contacts 5. Here, the first contact region 10 is advantageously so large that it produces and also maintains a first contact between cell stacks 2 when moving into and reaching a first contact position, while the contact key element 4 is moved further in, i.e., is moved into further contact positions. After this, successive further contacts between further cell stacks 2 and finally, upon reaching the final contact position, the attachment contacts 5, which lead to battery attachments, are electrically contacted. Thus, an erroneous handling can be completely precluded.

Figure 3:
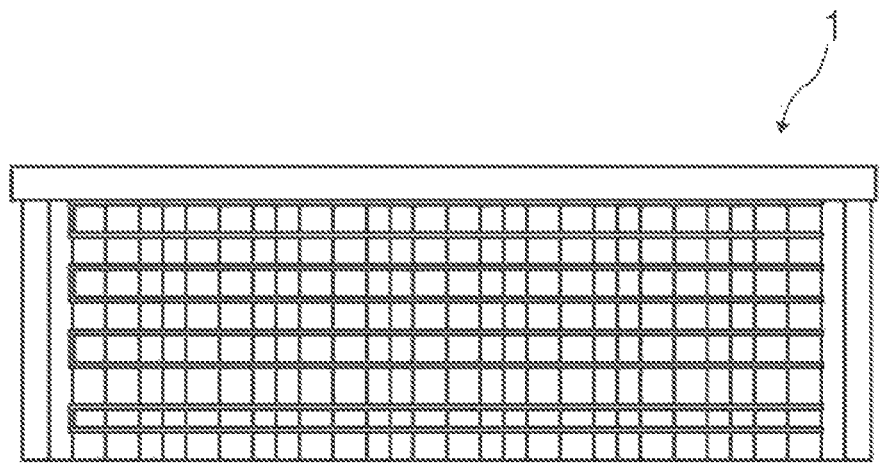
FIG. 3, schematically, shows the battery unit from FIG. 1 in a side view, wherein none of the contact key elements are in their respective contact positions.
Figure 4:
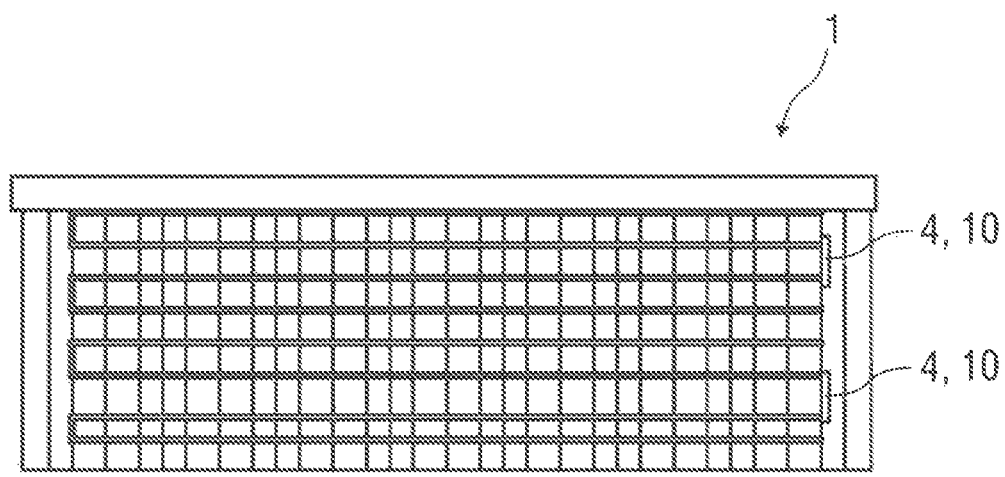
FIG. 4, schematically, shows the battery unit from FIG. 1 in a side view, wherein first contact key elements are in their respective contact positions.
Figure 5:
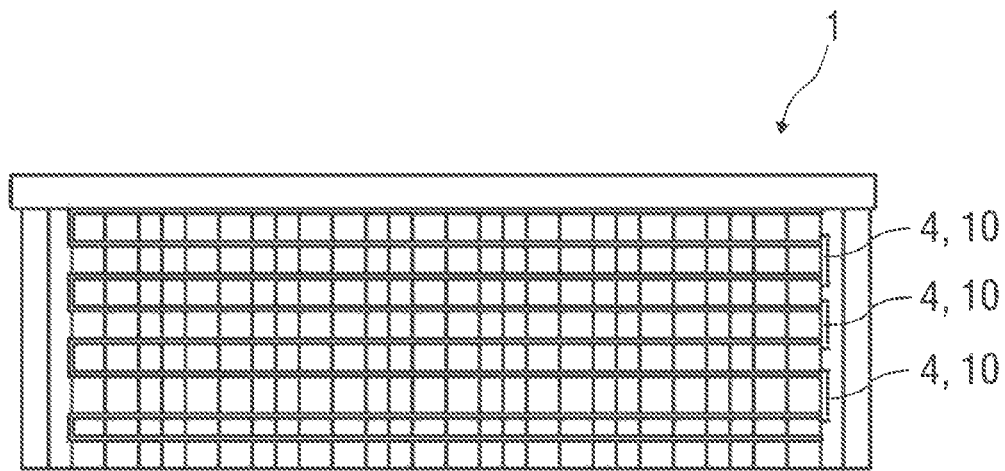
FIG. 5, schematically, shows the battery unit from FIG. 1 in a side view, wherein first and second contact key elements are in their respective contact positions.
Figure 6:
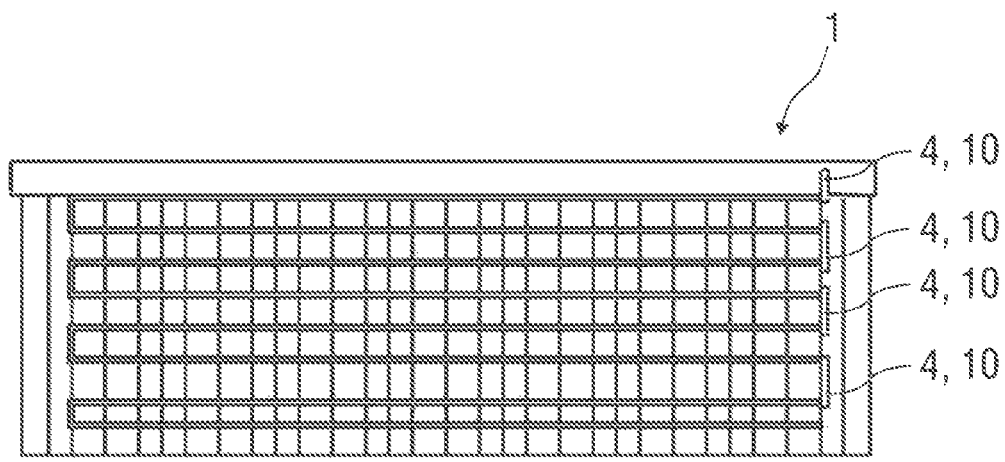
FIG. 6, schematically, shows the battery unit from FIG. 1 in a side view, wherein all contact key elements are in their respective contact positions.

In the example depicted here, based on the cell stacks 2 depicted in FIG. 3 still not electrically interconnected in series, firstly the upper cell stacks 2 of the respective cell stack strand 6 are interconnected to one another electrically in series by means of the two inner contact key elements 4, and the lower cell stacks 2 of the respective cell stack strand 6 are interconnected to one another electrically in series, as shown in FIG. 4, wherein this is carried out symmetrically in the two cell stack strands 6. Then, as shown in FIG. 5, all cell stacks 2 of the respective cell stack strands 6 are interconnected to one another electrically in series by means of the outer contact key elements 4, wherein this is also carried out symmetrically in the two cell stack strands 6. Finally, the cell stacks 2 of the two cell stack strands 6 are connected to one another electrically in series by means of the central contact key element 4 and are electrically contacted with the attachment contacts 5, as shown in FIG. 6.

In a method for electrically interconnecting the cell stacks 2 of the battery unit 1, the one contact key element 4 is thus moved successively into different contact positions or, as in the example depicted here, the plurality of contact key elements 4 are moved successively into their respective contact position, whereby the cell stacks 2 are firstly interconnected to one another electrically in series by means of the contact regions 10 and finally are electrically contacted with the electrical attachment contacts 5.

In the opposite direction, i.e., in a method for separating the electrical interconnection of the cell stacks 2 of the battery unit 1, the one contact key element 4 is removed successively out of the various contact positions or, as in the example depicted here, the plurality of contact key elements 4 are removed successively out of their respective contact positions, whereby firstly the electrical contact of the cell stacks 2 with the electrical attachment contacts 5 is separated and then the electrical interconnection between the cell stacks 2 is separated.

LIST OF REFERENCE CHARACTERS

1 Battery unit
2 Cell stack
3 Individual cells
4 Contact key element
5 Attachment contact
6 Cell stack strand
7 Connection element
8 Plastic part
9 Positioning pin
10 Contact region
11 Handling element
12 Traction anchor

The invention claimed is:

1. A battery unit of a vehicle, comprising:
   a first plurality of cell stacks which each include a respective plurality of cells electrically interconnected to one another;
   an electrical attachment contact; and
   a first contact key element, wherein the first contact key element has a first contact region and is electrically insulating outside of the first contact region,
   wherein the first contact key element is moveable into a first contact position in which the first contact region electrically interconnects the first plurality of cell stacks to one another, and
   wherein the first contact key element is further moveable from the first contact position into a second contact position in which the first contact region electrically connects the electrically interconnected first plurality of cell stacks to the electrical attachment contact.

2. The battery unit according to claim 1 further comprising a second plurality of cell stacks, wherein the first contact key element has a second contact region, and wherein the second plurality of cell stacks are electrically interconnectable by the second contact region.

3. The battery unit according to claim 2:
   wherein the first contact key element is formed as a rod and wherein the first contact region and the second contact region are disposed one behind the other in a longitudinal extension direction of the rod; or
   wherein the first contact key element is formed as a comb and wherein the first contact region and the second contact region are disposed one next to the other on a comb base body.

4. The battery unit according to claim 1, wherein the first contact key element is movable from outside of the first plurality of cell stacks that are mechanically connected to one another.

5. The battery unit according to claim 1 further comprising a second contact key element, wherein the first contact key element and the second contact key element have different shapes which respectively correspond to a respective receiver recess of the battery unit.

6. The battery unit according to claim 1 further comprising a second contact key element, wherein the first contact key element and the second contact key element differ from each other in respective color and/or respective length.

7. The battery unit according to claim 1 further comprising a second contact key element, wherein the first contact key element and the second contact key element are connected to one another via a handling element.

8. A method for electrically interconnecting the first plurality of cell stacks of the battery unit according to claim 1, comprising:
   in a first step, electrically interconnecting the first plurality of cell stacks to one another via the first contact region of the first contact key element by moving the first contact key element into the first contact position of the first contact key element; and
   in a second step subsequent to the first step, electrically connecting the first plurality of cell stacks to the electrical attachment contact by moving the first contact key element into the second contact position of the first contact key element.

9. A method for separating an electrical interconnection of the first plurality of cell stacks of the battery unit according to claim 1, comprising:
   in a first step, electrically disconnecting the first plurality of cell stacks that are interconnected electrically to one another from the electrical attachment contact by moving the first contact key element out of the second contact position of the first contact key element and into the first contact position of the first contact key element; and
   in a second step subsequent to the first step, electrically disconnecting the first plurality of cell stacks from one another via the first contact region of the first contact key element by moving the first contact key element out of the first contact position of the first contact key element.

* * * * *